(12) United States Patent
Rai et al.

(10) Patent No.: US 7,551,799 B2
(45) Date of Patent: Jun. 23, 2009

(54) APPARATUS AND METHOD FOR IMAGE NOISE REDUCTION

(75) Inventors: Barinder Singh Rai, Surrey (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 573 days.

(21) Appl. No.: 11/128,974

(22) Filed: May 13, 2005

(65) Prior Publication Data
US 2006/0257046 A1    Nov. 16, 2006

(51) Int. Cl.
*G06K 9/40* (2006.01)

(52) U.S. Cl. .................................... 382/275

(58) Field of Classification Search .......... 382/270, 382/275
See application file for complete search history.

(56) References Cited

U.S. PATENT DOCUMENTS

| | | | | |
|---|---|---|---|---|
| 5,317,420 | A | * | 5/1994 | Kuwahara .................... 358/463 |
| 5,453,787 | A | * | 9/1995 | Hancock et al. .......... 375/240.01 |
| 6,108,455 | A | | 8/2000 | Mancuso |
| 6,229,578 | B1 | | 5/2001 | Acharya et al. |
| 6,526,181 | B1 | | 2/2003 | Smith et al. |
| 6,535,254 | B1 | * | 3/2003 | Olsson et al. ................ 348/607 |
| 6,625,325 | B2 | | 9/2003 | Gindele et al. |
| 6,795,586 | B1 | | 9/2004 | Gindele et al. |
| 6,862,102 | B1 | * | 3/2005 | Meisner et al. ............. 358/1.15 |
| 6,970,268 | B1 | * | 11/2005 | Shin et al. ..................... 358/1.9 |

| | | |
|---|---|---|
| 2003/0048368 A1 | 3/2003 | Bosco et al. |
| 2003/0091232 A1 | 5/2003 | Kalevo et al. |
| 2003/0095717 A1 | 5/2003 | Gindele et al. |
| 2004/0027469 A1 | 2/2004 | Tsuruoka |
| 2004/0119861 A1 | 6/2004 | Bosco et al. |

FOREIGN PATENT DOCUMENTS

| | | |
|---|---|---|
| EP | 1 289 309 A1 | 3/2003 |
| JP | 2003-153290 | 5/2003 |
| WO | WO 99/30547 | 6/1999 |

OTHER PUBLICATIONS

Adaptive Filtering for Image Denoising, Agnelo Bosco, Massimo Mancuso, ST Microelectronics—AST Lab, 0-7803-6622-0/01, 2001 IEEE, (pp. 208-209).

Temporal Noise Reduction of Bayer Matrixed Video Data, Angelo Bosco, Massimo Mancuso, Sebastiano Battiato, Giuseppe Spampinato, ST Microelectronics, 0-7803-7304-9/02, 2002 IEEE, (pp. 681-684).

* cited by examiner

*Primary Examiner*—Bhavesh M Mehta
*Assistant Examiner*—Hadi Akhavannik

(57) ABSTRACT

A hardware implemented method for reducing noise in an image is provided. In this method, a difference between color values of corresponding pixels within the image is calculated, and the calculated difference is compared with a threshold value. The threshold value is defined as a rate of color value change between the corresponding pixels. If the calculated difference is greater than the threshold value, the color value of at least one of the corresponding pixels is replaced with an average color value. A graphics controller and image capture device interface for reducing noise in an image also are described.

20 Claims, 7 Drawing Sheets

APPARATUS AND METHOD FOR IMAGE NOISE REDUCTION

BACKGROUND

An image capture device (e.g., digital camera and digital camcorder) typically includes a sensor (e.g., a complementary metal oxide sensor (CMOS) or a charge-coupled device (CCD)) to capture the image. The sensor is a light-sensitive integrated circuit that stores and displays data for an image in such a way that each pixel in the image is converted into an electrical charge the intensity of which is related to a monochrome color. With millions of individual sensor units used in a typical digital camera, it is very probable that the sensor often contains defective sensor units sporadically dispersed throughout. These defective sensor units may provide a full on or off signal that causes noise in the corresponding image.

To compensate for the defective sensors, one conventional noise reduction technique is to replace a color of a defective pixel with a color of an adjacent pixel. Another noise reduction technique is to replace the color of the defective pixel with an average color of adjacent pixels. A limitation with both of these conventional noise reduction techniques is that the defective pixels cannot be next to each other because the replacement color directly corresponds to the color of adjacent pixels. For instance, if two defective pixels are next to each other, and the replacement color for one of the defective pixels is based on the color of the adjacent, defective pixel, then the replacement color is also defective.

In view of the foregoing, there is a need to provide methods and apparatuses for reducing noise in an image that has defective pixels next to each other.

SUMMARY

Broadly speaking, the present invention fills these needs by providing hardware implemented methods and apparatuses for reducing noise in an image. It should be appreciated that the present invention can be implemented in numerous ways, including as a method, a system, or a device. Several inventive embodiments of the present invention are described below.

In accordance with a first aspect of the present invention, a hardware implemented method for reducing noise in an image is provided. In this method, a difference between color values of corresponding pixels within the image is calculated, and the calculated difference is compared with a threshold value. The threshold value is defined as a rate of color value change between the corresponding pixels. If the calculated difference is greater than the threshold value, the color value of at least one of the corresponding pixels is replaced with an average color value.

In accordance with a second aspect of the present invention, an image capture device interface for reducing noise in an image is provided. The image capture device interface includes circuitry for determining that a difference between color values of a first pixel and a second pixel within the image is greater than a threshold value, and circuitry for successively searching for a third pixel within the image that has a color value difference with the first pixel less than the threshold value. Additionally included in image capture device interface is circuitry for calculating an average color value of the first and third pixels and circuitry for replacing the color value of the second pixel with the average color value.

In accordance with a third aspect of the present invention, a graphics controller for reducing noise in an image is provided. The graphics controller includes an image capture device interface and a video buffer in communication with the image capture device interface. Additionally included is an image noise reduction module in communication with the video buffer. The image noise reduction module includes circuitry for calculating differences between color values of a first pixel and corresponding pixels within the image, and circuitry for comparing each of the calculated differences with a threshold value to identify defective pixels. Circuitry for successively searching for a second pixel that has a color value difference with the first pixel less than the threshold value is also included. The image noise reduction module further includes circuitry for calculating color values with a graduating color change based on the color values of the first and second pixels, and circuitry for replacing color values of the defective pixels with the calculated color values with the graduating color change.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for hardware implemented methods and apparatuses for reducing noise in an image. It will be obvious, however, to one skilled in the art, that the present invention may be practiced without some or all of these specific details. In other instances, well known process operations have not been described in detail in order not to unnecessarily obscure the present invention.

The embodiments described herein provide hardware implemented methods and graphics controllers for reducing noise in an image. In one embodiment, a difference between color values of corresponding pixels within the image is calculated. The calculated difference is compared with a threshold value and, as will be explained in more detail below, in one embodiment, the threshold value is a rate of color value change between the corresponding pixels. To reduce noise, if the calculated difference exceeds the threshold value, the color value of at least one of the corresponding pixels is replaced with an average color value.

Figure 1:
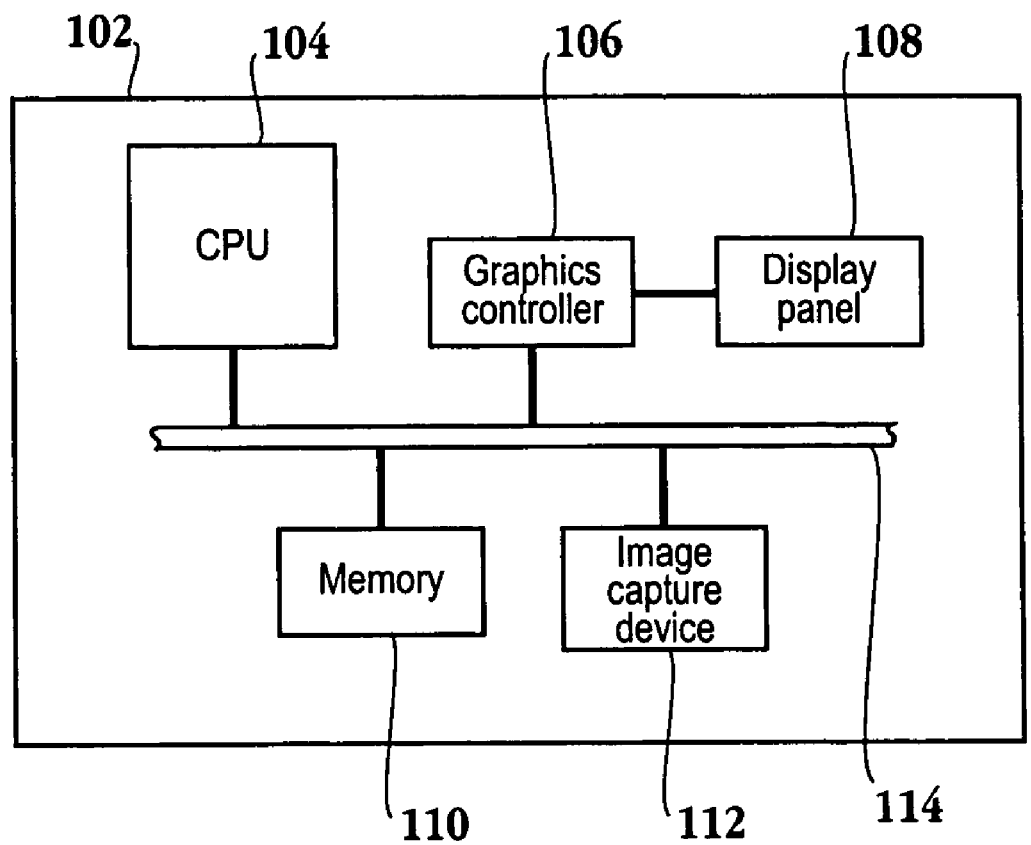
FIG. 1 is a simplified schematic diagram of an apparatus for reducing noise in an image, in accordance with one embodiment of the present invention.

FIG. 1 is a simplified schematic diagram of an apparatus for reducing noise in an image, in accordance with one embodiment of the present invention. Apparatus 102 includes any suitable type of computing device. For example, apparatus 102 may be a personal digital assistant, a cell phone, a web tablet, a pocket personal computer, a portable electronic computing device, etc. As shown in FIG. 1, apparatus 102 includes central processing unit (CPU) 104, memory 110, graphics controller 106, display panel 108, and image capture device 112. Graphics controller 106 is in communication with CPU 104, memory 110, display panel 108, and image capture device 112. One skilled in the art will appreciate that CPU 104, memory 110, graphics controller 106, and image capture device 112 may be in communication through common bus 114.

Image capture device 112 records photographic images as image data and outputs the raw image data to graphics controller 106 for display on display panel 108. For example, image capture device 112 may include a charge-coupled device (CCD) to capture the image. It should be appreciated that the CCD is a light-sensitive integrated circuit that stores and displays data for an image in such a way that each pixel in the image is converted into an electrical charge the intensity of which is related to a monochrome color. Of course, a complementary metal-oxide semiconductor (CMOS) chip, a widely used type of semiconductor, may be utilized instead of a CCD. Exemplary graphics controller 106 includes a liquid crystal display controller (LCDC), mobile graphics controllers, etc. Display panel 108 may include random access memory (RAM) integrated display panels, liquid crystal displays (LCD), thin-film transistor (TFT) displays, cathode ray tube (CRT) monitors, televisions, etc. Furthermore, apparatus 102 includes CPU 104 that processes the basic instructions that drive the apparatus, and the apparatus additionally includes memory 110 (e.g., static access memory (SRAM), dynamic random access memory (DRAM), etc.) that is configured to store data and instructions.

Figure 2A:
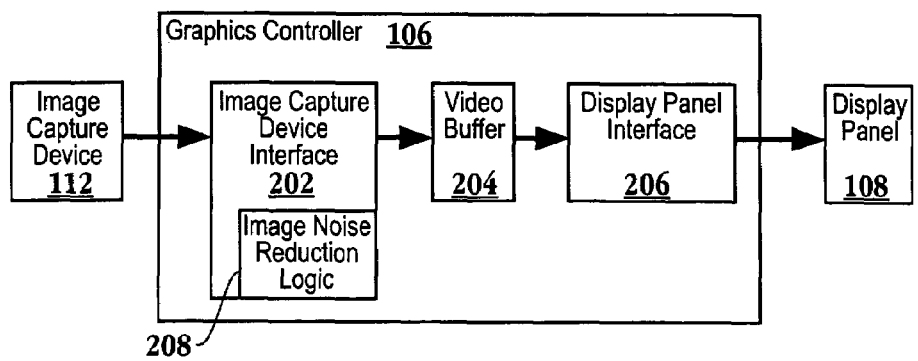
FIGS. 2A and 2B are simplified schematic diagrams of the graphics controller shown in FIG. 1, in accordance with embodiments of the present invention.
Figure 2B:
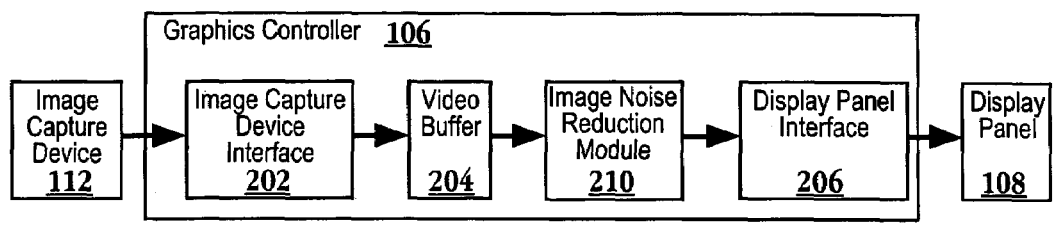

FIGS. 2A and 2B are simplified schematic diagrams of the graphics controller shown in FIG. 1, in accordance with embodiments of the present invention. As shown in FIG. 2A, graphics controller 106 includes image capture device interface 202, video buffer 204, and display panel interface 206. Image capture device interface 202 interfaces graphics controller 106 with image capture device 112 and sends the raw image received from the image capture device to video buffer 204 for temporary storage. One skilled in the art will appreciate that video buffer 204 stores the image for display panel 108, and functions as a buffer between a CPU or image capture device 112 and display panel 108. From video buffer 204, the image is then sent to display panel 108 for display through display panel interface 206.

Graphics controller 106 includes the circuitry and/or logic for reducing noise in an image, and such image noise reduction circuitry and/or logic can be included in any suitable location within the graphics controller. For example, in one embodiment, FIG. 2A shows image noise reduction logic 208 included in image capture device interface 202. As will be explained in more detail below, in one embodiment, image noise reduction logic 208 includes logic for calculating differences between color values of corresponding pixels within the image. Additionally included in image noise reduction logic 208 is logic for comparing each of the calculated differences with a threshold value, and logic for replacing the color value of at least one of the corresponding pixels with an average color value if the calculated difference is greater than the threshold value. After the color values are replaced, the corrected image with reduced noise is sent to video buffer 204 for temporary storage and then to display panel 108 for display.

In another embodiment, FIG. 2B shows circuitry and/or logic for reducing noise in the image included in image noise reduction module 210. Within graphics controller 106, image noise reduction module 210 is in communication with display panel interface 206 and video buffer 204. In this embodiment, image capture device interface 202 sends the image captured from image capture device 112 to image noise reduction module 210 through video buffer 204. As will be explained in more detail below, image noise reduction module 210 includes the circuitry and/or logic that reduce the noise in the image and send the corrected image with the reduced noise to display panel interface 206 for display on display panel 108. It should be appreciated that in addition to images captured by image capture device 112, images may also be supplied to graphics controller 106 from other sources, such as a CPU. In this embodiment, graphics controller 106 additionally includes a host interface (not shown) that receives the image from the CPU and sends the image to image noise reduction module 210 for noise reduction.

Figure 3:
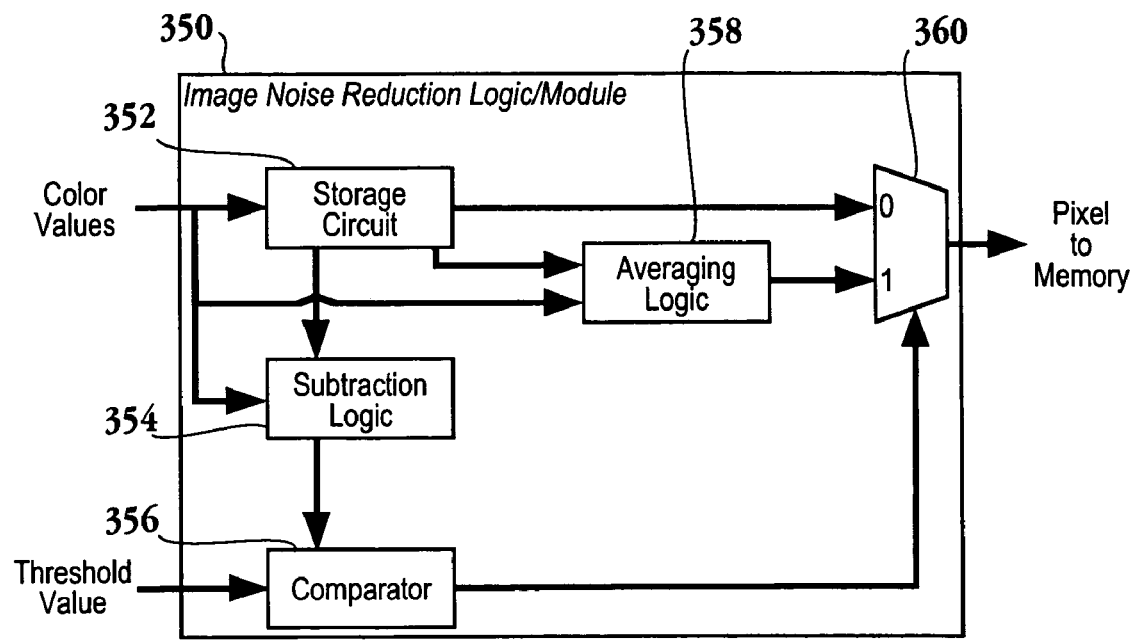
FIG. 3 is a more detailed schematic diagram of the image noise reduction logic and the image noise reduction module shown in FIGS. 2A and 2B, respectively, in accordance with one embodiment of the present invention.

FIG. 3 is a more detailed schematic diagram of the image noise reduction logic and the image noise reduction module shown in FIGS. 2A and 2B, respectively, in accordance with one embodiment of the present invention. As shown in FIG. 3, image noise reduction logic/module 350 includes storage circuit 352, subtraction logic 354, comparator 356, averaging logic 358, and selection circuitry 360. In this embodiment, subtraction logic 354 receives a color value, and reads another color value of a corresponding pixel stored in storage circuit 352 (e.g., a shift register). Subtraction logic 354 calculates a difference between the corresponding pixels within the image and sends the difference to comparator 356. At the same time, averaging logic 358 calculates an average color value of the two color values. Comparator 356 then compares the difference with a threshold value inputted into the comparator.

Selection circuitry 360 selects either the average color value received from averaging logic 358 or color value of the corresponding pixel from storage circuit 352 for output. One skilled in the art will appreciate that selection circuitry 360 may be a 2:1 multiplexer. The output selection depends on a third input (i.e., a select signal) from comparator 356. If comparator 356 calculates a difference greater than the threshold value (i.e., defective pixel), then the comparator sends a select signal (e.g., a 1 value) to selection circuitry 360 to output the average color value from averaging logic 358. Else, if comparator 356 calculates a difference less than the threshold value (i.e., a non-defective pixel), then the comparator sends a select signal (e.g., a 0 value) to selection circuitry 360 to output the color value of the corresponding pixel from storage circuit 352.

Figure 4:
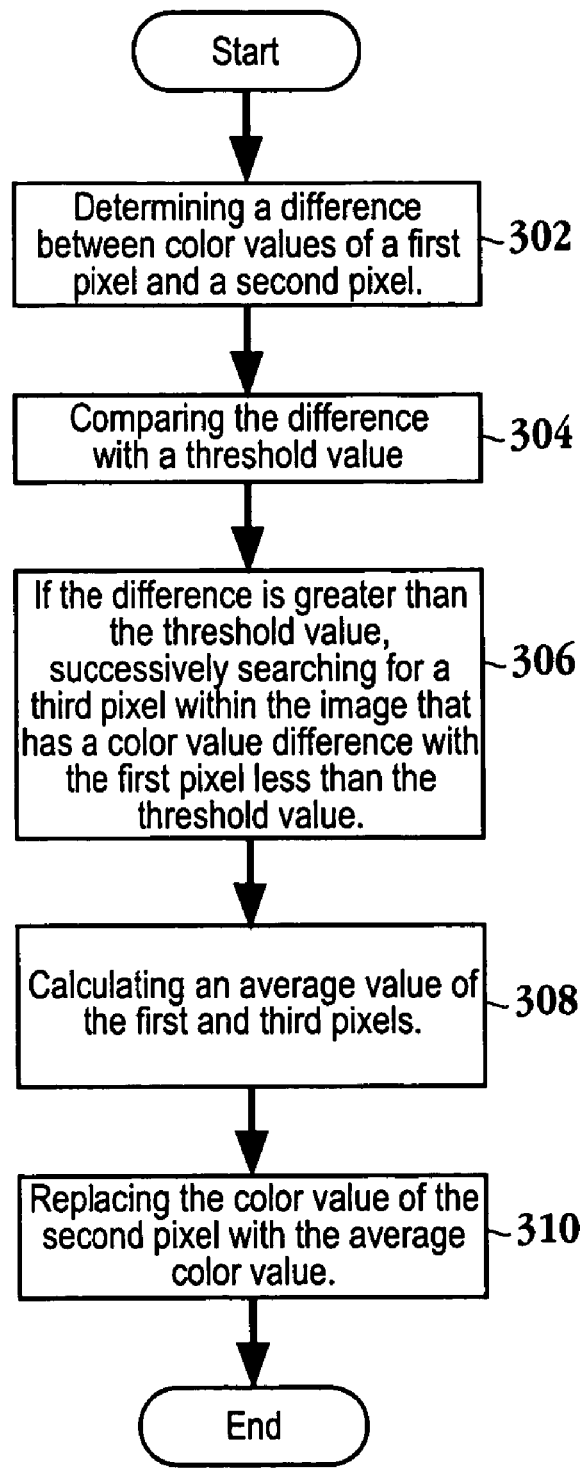
FIG. 4 is a flowchart diagram of high level method operations for reducing noise in an image, in accordance with one embodiment of the present invention.

FIG. 4 is a flowchart diagram of high level method operations for reducing noise in an image, in accordance with one embodiment of the present invention. As shown on FIG. 4, starting in operation 302, a difference is determined between color values of a first pixel and a second pixel within the image. The color values are from the same color component. In other words, the color values are associated with either a red color component, a green color component, or a blue color component. The difference of the color values is then compared to a threshold value in operation 304. The threshold value may be a value specified by a user to detect defective pixel values or, as will be explained in more detail below, to smooth the image. In an image captured by an image capture device, the rate at which the color value of one pixel changes from another corresponding pixel is usually constant. As will be explained in more detail below, corresponding pixels are pixels that have the same color component. Even with a captured image comprising of black and white objects, the edges between the objects may look sharp to the eye, but the transition of color values actually occurs over several pixels. It should be appreciated that an image with true edges (i.e., without color transitions) can only be generated by or created on a computer. Defective pixels can be detected and corrected using the fact that the rate of color value change is constant between corresponding pixels within an image. Thus, in one embodiment, the user may set the threshold value as the rate of color value change such that if a difference between color values of corresponding pixels is greater than the threshold value, then such a large difference indicates that one of the corresponding pixels is a defective pixel. Although the rate of color value change is constant between corresponding pixels, it should be noted that the rate of color value change can be different for different color components. For instance, the rate of color value change of a green component can be different than the rate of color value change of a red component, even though both the red and green components are derived from the same pixels. Accordingly, in one embodiment, the user can set a different threshold value for each red, green, or blue color component.

As shown in operation 306, if the difference is greater than the threshold value, then the second pixel is a defective pixel. A successive search is then conducted to find a third pixel that has a color value difference with the first pixel that is less than the threshold value. In other words, a successive search is conducted to find a non-defective pixel. Specifically, in one embodiment, the differences between color values of the first pixel and corresponding pixels are calculated. Each of the calculated differences then is compared with the threshold value. The closest corresponding pixel that has a calculated difference being less than the threshold value is selected as the third pixel.

Thereafter, in one embodiment, an average color value is calculated in operation 308 based on color values of the first pixel and the third pixel. For instance, $$avg.\_color\_value = \frac{first\_pixel\_color\_value + third\_pixel\_color\_value}{2} \quad (1.0)$$

The resulting average color value of equation (1.0) yields an intermediate color based on the colors of the first pixel and the third pixel. In addition to averaging the color values, it should be appreciated that the intermediate color can also be determined through other numerical methods. For example, in one embodiment, the intermediate color can be calculated by a weighted average of the first pixel and the third pixel, whereby the weighted average is based on a distance between the first pixel and the third pixel. Subsequently, in operation 310, to correct the second defective pixel, the color value of the second pixel is replaced with the calculated average color value. To reduce noise for the entire image, the method operations described above are repeated for every pixel in the image, and can be repeated for each red, green, or blue color component.

Figure 5A:
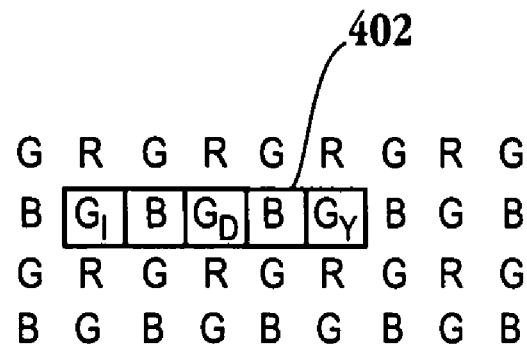
FIGS. 5A, 5B, and 5C are diagrams illustrating an exemplary noise reduction technique in a Bayer image, in accordance with one embodiment of the present invention.
Figure 5B:
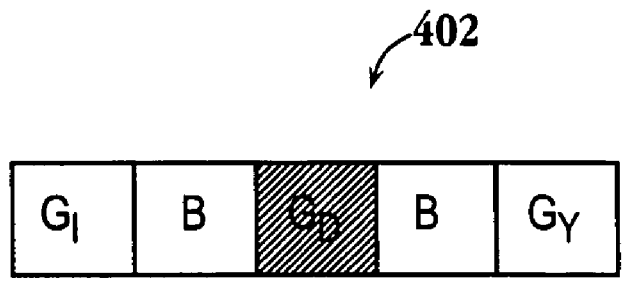
Figure 5C:
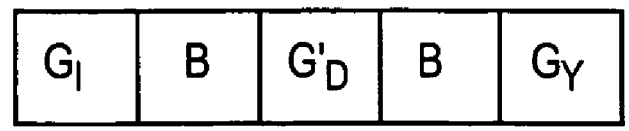

FIGS. 5A, 5B, and 5C are diagrams illustrating an exemplary noise reduction technique in a Bayer image, in accordance with one embodiment of the present invention. It should be noted that each pixel of an image has a sensor associated with the pixel. The sensor contains a light sensitive photodiode that measures the brightness of light. Since photodiodes are monochrome devices, they are unable to tell the differences between different wavelengths of light. To provide red, green, and blue (RGB) color sensitivity, a color filter array is applied on top of the sensor arrays to filter out the RGB components of light falling onto the sensors. The color filter array typically uses a 3-color RGB pattern. For example, as shown in FIG. 5A, a popular color filter array is a Bayer filter that has an RGB filter pattern arranged in a quartet ordered in successive rows that alternate either red and green or blue and green filters. Since each pixel has been made sensitive only to one color, the two missing color components required for a full RGB value may be estimated based on the color values of corresponding pixels via interpolation algorithms in the camera.

FIG. 5B shows a row of pixels 402 from the filter array of FIG. 5A. As shown in FIG. 5B, row of pixels 402, from left to right, includes color values $G_I$, B, $G_D$, B, and $G_Y$, whereby G represents the green color component and B represents the blue color component. Here, $G_D$ is a defective pixel. For illustrative purposes, the method operations described above may be applied to detect and correct the defective pixel $G_D$ within row of pixels 402. For example, a difference between $G_I$ and corresponding $G_D$ (i.e., $|G_I - G_D|$) first is calculated. It should be appreciated that the difference is not calculated between $G_I$ and B because green and blue are different color components. As discussed above, embodiments of the present invention calculate the differences between color values of the same color component. Thus, for non-Bayer image data where each pixel has all three red, green, and blue color values, a difference is calculated for each of the three color components between pixels that are immediately adjacent to each other, in accordance with one embodiment of the present invention.

The calculated difference then is compared with a predetermined threshold value, and if the difference is greater than the threshold value, then $G_D$ is a defective pixel. In this example, $G_D$ is a defective pixel and, as such, the calculated difference is greater than the threshold value. As a result, a successive search is conducted to find a non-defective pixel that has a green color value difference with $G_I$ that is less than the threshold value. Specifically, in one embodiment, another difference is calculated between $G_I$ and a next, closest corresponding pixel $G_Y$. The difference between $G_I$ and $G_Y$ then is compared to the threshold value. If the difference between $G_I$ and $G_Y$ is less than the threshold value, then a replacement color value for $G_D$ can be calculated based on $G_I$ and $G_Y$. However, if the difference between $G_I$ and $G_Y$ is greater than the threshold value, then additional searches are conducted for a next pixel with a green color value that has a difference with $G_I$ being less than the threshold value.

Assuming that the difference between $G_I$ and $G_Y$ is less than the threshold value, to correct the defective pixel $G_D$, an average color value can be calculated based on $G_I$ and $G_Y$. In one embodiment, using equation (1.0), $$G'_D = \frac{G_I + G_Y}{2} \quad (1.2)$$

As shown in FIG. 5C, to correct the defective pixel $G_D$, $G_D$ is replaced with the calculated average color value $G_D'$. It should be appreciated that if $G_D$ is not a defective pixel, then the difference between $G_I$ and $G_D$ would be less than the threshold value. Accordingly, the method operations continue to the next pixel $G_D$ and another difference would then be calculated between $G_D$ and $G_Y$. To reduce noise within an image, the methods described above would then be repeated for each pixel within the image, whereby all the differences between corresponding pixels within the image are calculated and compared with the threshold value.

Figure 6:
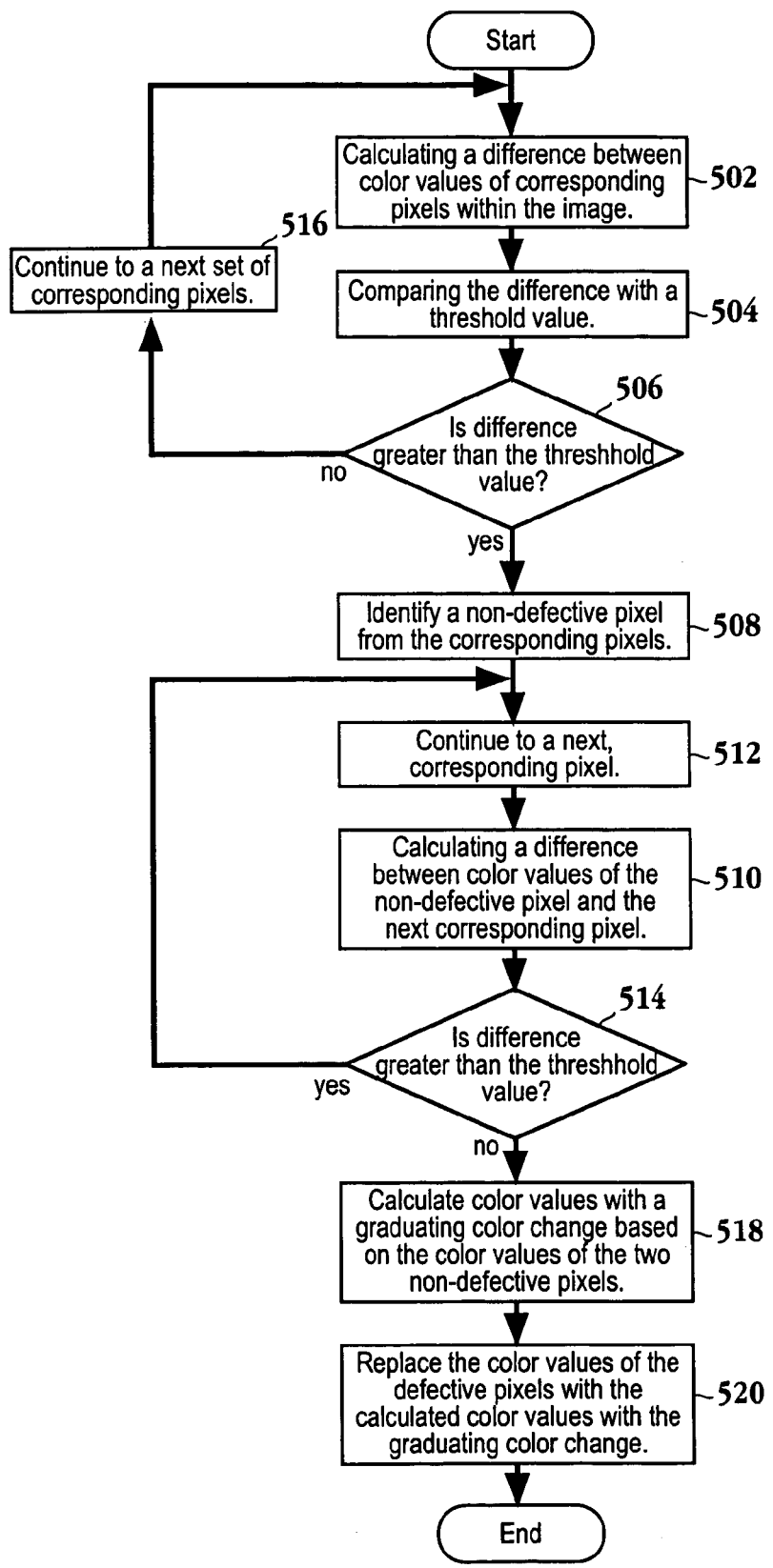
FIG. 6 is a flowchart diagram of a more detailed method operations for reducing noise in an image, in accordance with one embodiment of the present invention.

FIG. 6 is a flowchart diagram of a more detailed method operations for reducing noise in an image, in accordance with one embodiment of the present invention. As shown in FIG. 6, the method operations begin with operation 502 calculating a difference between color values of corresponding pixels within the image. Thereafter, in operation 504, the difference is compared with a threshold value. A decision then is made in operation 506. If the difference is less than the threshold value, then the method operations 502 and 504 repeat for a next set of corresponding pixels. On the other hand, if the difference is greater than the threshold value, then a defective pixel is detected within the corresponding pixels. In particular, the corresponding pixels include one non-defective pixel and one defective pixel. The non-defective pixel is identified in operation 508. For instance, in one exemplary embodiment, the non-defective pixel may be identified by having a color value difference with a previous pixel that is less than the threshold value.

After the non-defective pixel is identified, the method operations continue to a next, corresponding pixel in operation 512, and a difference is calculated between the color values of the non-defective pixel and the next, corresponding pixel in operation 510. As shown in operation 514, if the difference is greater than the threshold value, the next, corresponding pixel is a defective pixel. As a result, the method operations continue to a next, corresponding pixel and method operation 510 is repeated. However, if the difference is less than the threshold value, then a second non-defective pixel is found. Accordingly, color values with a graduating color change are calculated in operation 518 based on the color values of the two non-defective pixels. As discussed above, to calculate the graduating color change, the average color value of the two non-defective pixels may be used, in accordance with one embodiment of the present invention. After the calculation, the color values of the defective pixels are replaced in operation 520 with the calculated color values with the graduating color change.

Figure 7A:
FIGS. 7A and 7B are diagrams illustrating another exemplary noise reduction technique in a Bayer image, in accordance with one embodiment of the present invention.
Figure 7B:
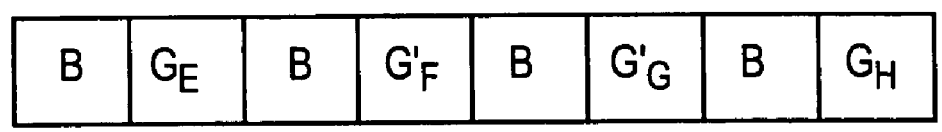

FIGS. 7A and 7B are diagrams illustrating another exemplary noise reduction technique in a Bayer image, in accordance with one embodiment of the present invention. As shown in FIG. 7A, row of pixels 602, from left to right, includes color values B, $G_E$, B, $G_F$, B, $G_G$, B, and $G_H$. In this example, $G_F$ and $G_G$ are defective pixels. Initially, as discussed above, a difference between color values $G_E$ and corresponding $G_F$ is calculated, and the calculated difference is compared with a threshold value to identify defective pixels. The difference is greater than the threshold value because $G_F$ is a defective pixel. As a result, a successive search is conducted for a second pixel that has a color value difference with $G_E$ less than the threshold value (i.e., search for a second non-defective pixel). Specifically, the successive search is conducted by calculating the difference between $G_E$ and a next, corresponding pixel. In this example, the next, corresponding pixel after $G_F$ is pixel with color value $G_G$. Again, the calculated difference between $G_E$ and $G_G$ is greater than the threshold value because $G_G$ is also a defective pixel. Continuing the successive search for the second non-defective pixel, another color value difference is calculated between $G_E$ and a next, corresponding pixel after $G_G$. As shown in FIG. 7A, the next, corresponding pixel after $G_G$ has color value $G_H$, and the difference between $G_E$ and $G_H$ is less than the threshold value because $G_H$ is a non-defective pixel. Thus, pixel with color value $G_H$ is identified as the second non-defective pixel that is closest to $G_E$. By selecting the closest non-defective pixel closest to $G_E$, the non-defective pixels $G_E$ and $G_H$ effectively encompass the defective pixels $G_F$ and $G_G$.

The comparisons discussed above are with respect to a fixed threshold value. However, in another embodiment, the threshold value can change depending on the distance between corresponding pixels. As discussed above, the rate at which the color value of one pixel changes from another corresponding pixel is usually constant. Since the change is constant, then the rate of change is directly proportional to a distance between two pixels. In other words, the rate of change between two pixels in an image that are close to each other is smaller than the rate of change between two pixels within the same image that are further apart. To compensate for the varying rate of change, the threshold value can be adjusted based on the distance between two corresponding pixels. In one embodiment, the threshold value can be increased as the distance between the two pixels increases. For example, referring to the example of FIG. 7A, the difference between $G_E$ and $G_F$ is compared with a default threshold value. Thereafter, another difference is calculated between $G_E$ and $G_G$. Since the distance between $G_E$ and $G_G$ is greater than the distance between $G_E$ and $G_F$, the threshold value is increased from the default threshold value and, as such, a comparison of the difference between $G_E$ and $G_G$ is made with the increased threshold value. Without adjusting the threshold value, the above-described method operations may mistakenly identify a non-defective pixel as a defective pixel. For example, still referring to FIG. 7A, the rate of change between $G_E$ and $G_H$ is greater than the rate of change between $G_E$ and $G_F$ because $G_E$ and $G_H$ are further apart. However, if the default threshold value is based on the rate of change between $G_E$ and $G_F$, then the difference between $G_E$ and $G_H$ may exceed the default threshold value, and $G_H$ will be erroneously identified as a defective pixel.

After the non-defective pixels with color values $G_E$ and $G_H$ are identified, color values with a graduating color change can be calculated based on the color values of $G_E$ and $G_H$. In one embodiment, the graduating color change is calculated by weighted averages of $G_E$ and $G_H$:

$$G'_F = \frac{2G_E + G_H}{3} \text{ and } G'_G = \frac{G_E + 2G_H}{3} \qquad (1.3)$$

Thereafter, the color values of a row of defective pixels are replaced by the calculated color values with the graduating color change. In other words, as shown in FIG. 7B, $G_F$ and $G_G$ are replaced with average color values $G_F'$ and $G_G'$, respectively. The replacement of the defective pixels' color values with calculated color values based on non-defective pixels effectively reduces noise in row of pixels 602. To reduce noise in the entire image, the method operations described above may be successively repeated for each pixel in the image.

In addition to correcting defective pixels, it should be appreciated that the method operations described above can also be applied to image editing applications. In one exemplary embodiment, the threshold value is not fixed to the rate of change of color values between pixels. Instead, a user may set the threshold value to any suitable value lower than the rate of change. The application of a lower threshold value effectively smoothes the image because, depending on the threshold value, many or all the pixels' color values within the image are replaced with average color values. As a result, the user can specify a degree of image smoothing by adjusting the threshold value.

In summary, the above described invention provides hardware implemented methods and apparatuses for reducing noise in an image. By comparing color value differences with a threshold value and replacing defective pixels with calculated color values with a graduating color change, embodiments of the invention enable the correction of a row of defective pixels. In other words, embodiments of the invention can reduce noise in an image that has defective pixels next to each other. Furthermore, instead of having an external CPU execute the above described embodiments, the implementation of the noise reduction circuitry and/or logic in the graphics controller allows noise reduction to be processed by the graphics controller in real time as image is received. Added advantages of implementing the noise reduction circuitry and/or logic in the graphics controller include low gate implementation and low power requirements. Finally, providing the capability to adjust the threshold value advantageously allows a user to control the degree of noise reduction in an image.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A hardware implemented method for reducing noise in an image, comprising method operations of:
   calculating a difference between color value pairs of corresponding pixels within the image;
   comparing the calculated difference of a first color value pair with a threshold value, the threshold value being defined as a rate of color value change between the corresponding pixels;
   if the calculated difference is greater than the threshold value, replacing a color value of at least one of the corresponding pixels of the first color value pair with an average color value, wherein the average color value is calculated using corresponding pixels of a second color value pair where the calculated difference is below the threshold value; and
   storing a corrected image on a storage device, wherein the corrected image incorporates the average color value of the second color value pair based on the comparing of the calculated difference with the threshold value.

2. The hardware implemented method of claim 1, further comprising:
   adjusting the threshold value based on a distance between the corresponding pixels.

3. The hardware implemented method of claim 1, wherein the average color value is a weighted average color value of the corresponding pixels based on a distance between the corresponding pixels.

4. The hardware implemented method of claim 1, wherein the threshold value is different for each color component.

5. The hardware implemented method of claim 1, further comprising:
   repeating each of the method operations for a next color component.

6. An image capture device interface for reducing noise in an image, comprising:
   circuitry for determining that a difference between color values of a first pixel and a second pixel within the image is greater than a threshold value;
   circuitry for identifying a third pixel within the image with a color value difference with the first pixel less than the threshold value if the difference between color values of the first pixel and the second pixel is greater than a threshold value, the identifying performed by successively searching pixels within a same row as the first pixel;
   circuitry for calculating an average color value of the first and third pixels, wherein the calculated difference between color values of the first and the third pixel is below the threshold value; and
   circuitry for replacing the color value of the second pixel with the average color value based on an output from a comparator comparing the calculated difference with the threshold value.

7. The image capture device interface of claim 6, further comprising:
   circuitry for adjusting the threshold value based on a distance between the first and third pixels.

8. The image capture device interface of claim 7, wherein the circuitry for adjusting the threshold value includes,
   circuitry for increasing the threshold value as the distance between the first and third pixels increases.

9. The image capture device interface of claim 6, wherein the circuitry for determining the difference between the color values includes,
   a subtraction logic configured for calculating the difference between the color values of the first and second pixels; and
   the comparator in communication with the subtraction logic, the comparator being configured for comparing the calculated difference with the threshold value.

10. The image capture device interface of claim 6, wherein the circuitry identifying the third pixel within the image includes, circuitry for calculating differences between the color value of the first pixel and color values of corresponding pixels;

circuitry for comparing each of the calculated differences with the threshold value; and circuitry for selecting a pixel from the corresponding pixels that is closest to the first pixel and has a calculated difference being less than the threshold value, the selected pixel defining the third pixel.

11. A graphics controller for reducing noise in an image, comprising:

an image capture device interface;

a video buffer in communication with the image capture device interface;

an image noise reduction module in communication with the video buffer, the image noise reduction module including, circuitry for calculating differences between color values of a first pixel and corresponding pixels within the image, the corresponding pixels having one or more defective pixels;

circuitry for comparing each of the calculated differences with a threshold value to identify the one or more defective pixels;

circuitry for successively searching for a second pixel, the searching ending after identifying the second pixel that has a color value difference with the first pixel that is less than the threshold value;

circuitry for calculating color values with a graduating color change based on the color values of the first and second pixels, wherein the calculated difference between the first and the second pixel is below the threshold value;

circuitry for selecting one of the calculated graduating color change or the color value of the corresponding pixel, the selection based on an output from the comparison circuitry; and circuitry for replacing color values of the one or more defective pixels with an output of the selection circuitry.

12. The graphics controller of claim 11, wherein the circuitry for replacing the color values of the one or more defective pixels includes, circuitry for replacing the color values of a row of the one or more defective pixels.

13. The graphics controller of claim 11, wherein the graduating color change is calculated by weighted averages of the first and second pixels.

14. The graphics controller of claim 11, further comprising:

circuitry for adjusting the threshold value based on a distance between the corresponding pixels.

15. The graphics controller of claim 11, wherein the one or more defective pixels are identified by the corresponding pixels that have differences greater than the threshold value.

16. The graphics controller of claim 11, further comprising:

a display panel interface in communication with the image noise reduction module.

17. The graphics controller of claim 11, wherein the graphics controller is incorporated into a portable electronic computing device.

18. The graphics controller of claim 11, wherein the first and second pixels encompass the one or more defective pixels.

19. The graphics controller of claim 11, wherein the first and second pixels are non-defective pixels.

20. The method of claim 1, wherein the at least one of the corresponding pixels is a pixel different than the corresponding pixels used to calculate the difference between the color value pairs.

* * * * *